United States Patent
Woodell

(10) Patent No.: US 6,850,185 B1
(45) Date of Patent: Feb. 1, 2005

(54) RUNWAY OBSTACLE DETECTION SYSTEM AND METHOD

(75) Inventor: Daniel L. Woodell, Robins, IA (US)

(73) Assignee: Rockwell Collins, Cedar Rapids, IA (US)

(*) Notice: Subject to any disclaimer, the term of this patent is extended or adjusted under 35 U.S.C. 154(b) by 0 days.

(21) Appl. No.: 10/631,316

(22) Filed: Jul. 31, 2003

(51) Int. Cl.[7] ............................................. G01S 13/93
(52) U.S. Cl. .............................. 342/30; 342/29; 342/33; 342/357.06
(58) Field of Search ...................... 342/29–40, 63, 342/175, 357.01, 357.06, 357.13, 454–456

(56) References Cited

U.S. PATENT DOCUMENTS

| | | | | |
|---|---|---|---|---|
| 4,259,658 | A | * 3/1981 | Basov et al. | 340/951 |
| 5,661,486 | A | * 8/1997 | Faivre et al. | 342/33 |
| 6,018,698 | A | * 1/2000 | Nicosia et al. | 701/214 |
| 6,591,171 | B1 | * 7/2003 | Ammar et al. | 701/16 |
| 6,606,563 | B2 | * 8/2003 | Corcoran, III | 701/301 |
| 2002/0089432 | A1 | * 7/2002 | Staggs et al. | 340/945 |
| 2002/0147544 | A1 | * 10/2002 | Nicosia et al. | 701/207 |
| 2002/0163461 | A1 | * 11/2002 | Smithey | 342/29 |
| 2003/0225487 | A1 | * 12/2003 | Robert et al. | 701/4 |
| 2003/0227395 | A1 | * 12/2003 | Zeineh | 340/988 |

OTHER PUBLICATIONS

"The Vertical Profile of Radar Reflectivity of Convective Cells: A Strong Indicator of Storm Intensity and Lightning Probability?", E. Zipser and K. Lutz, American Meteorological Society, 1994, pp. 1751–1759.

* cited by examiner

*Primary Examiner*—Thomas H. Tarcza
*Assistant Examiner*—Isam Alsomiri
(74) *Attorney, Agent, or Firm*—Nathan O. Jensen; Kyle Eppele

(57) ABSTRACT

An airborne radar system is disclosed. The airborne radar system comprises a radar antenna, radar circuitry coupled to the radar antenna, and a runway database comprising runway location information. The airborne radar system also comprises a processing device retrieving from the runway database, runway location information for a runway being approached by an aircraft, based on the location of the aircraft, and directing a radar beam defined by a polygon which represents the runway and which is derived from the runway information, the processing device determining whether there are any obstacles on the runway.

19 Claims, 3 Drawing Sheets

RUNWAY OBSTACLE DETECTION SYSTEM AND METHOD

BACKGROUND

The invention relates generally to a sensor system for detecting obstacles on a runway. Further, the invention relates to an airborne radar or other airborne sensor system which is capable of detecting obstacles on a runway when an aircraft is in a landing mode or in a taxi mode. More particularly, the invention relates to an airborne radar or other airborne sensor system that is capable of detecting obstacles within a defined region which is representative of the runway, the defined region being retrieved from a runway database.

In conventional runway obstacle detection systems, land based radar systems are used to detect runway obstacles. In another conventional runway obstacle detection system, objects which may enter a runway, such as baggage carts, runway tugs, other aircraft, emergency vehicles, maintenance vehicles, etc., may carry transponders which provide location information such as generated from a GPS receiver. The transponders may relay information to a central control system which determines whether the object is on the runway. Such a system requires that all objects which would potentially incur the runway space would be tagged with a transponder and all transponders remain functioning properly. In many situations, such as in underdeveloped areas, for example, in third world countries, or small airports and the like, there may not be sufficient infrastructure to support tagging each cart with a transponder and having an appropriate central control system. Further, if the sensor system were airborne, the sensor system would typically focus on an area which is much larger than the runway itself. In such a case, too much information is relayed back to the pilot and the pilot must attempt to filter the information to determine whether there is an obstacle on the runway or whether the object may be off the runway, or whatever is detected is something of another nature.

Also, conventionally runway alerting and annunciation systems may be used as the pilot interface. However, such systems may be disadvantageous as alerts by the system are called out aurally to the pilot. Such aural warnings may be distracting amongst the other chatter and alarms which pervade the cockpit.

Accordingly, there is a need for an airborne obstacle detection system in which the location of the runway perimeter is retrieved from a database having runway location information stored therein. The database information that is retrieved is then used to form a polygon which defines the shape of the runway and detection of obstacles within the polygon are then communicated to the pilot. Accordingly, there is also a need for a radar system that allows the aircraft to operate autonomously in the U.S. and worldwide at any airport whether the airport being a minor airport or a major airport or whether the airport is in the U.S. or in any country. Further, there is a need for a runway obstacle detection system in which aural warnings are not required and may utilize the quiet and dark paradigm.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to an airborne radar system. The airborne radar system comprises a radar antenna, radar circuitry coupled to the radar antenna, and a runway database comprising runway location information. The airborne radar system also comprises a processing device retrieving from the runway database, runway location information for a runway being approached by an aircraft, based on the location of the aircraft, registering, the runway location using the sensing device based signal and the runway location information from the database, and directing a radar beam defined by a polygon which represents the runway and which is derived from the runway information; the processing device determining whether there are any obstacles on the runway.

Another example of the invention relates to an airborne sensing system. The airborne sensing system comprises a sensing device for sensing objects outside of an aircraft and a runway database comprising runway location information. The airborne sensing system also comprises a processing device retrieving from the runway database, runway location information for a runway being approached by an aircraft, based on the location of the aircraft, and directing a radar beam defined by a polygon which represents the runway and which is derived from the runway information, the processing device determining whether there are any obstacles on the runway.

Yet another example of the invention relates to a method of detecting an obstacle on a runway. The method comprises retrieving location information relating to the location of an aircraft, retrieving, based on the location information, data representative of the location of the runway, registering, the runway location using a radar based signal and the data, and sensing within the perimeter of the runway location, the presence of an obstacle.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
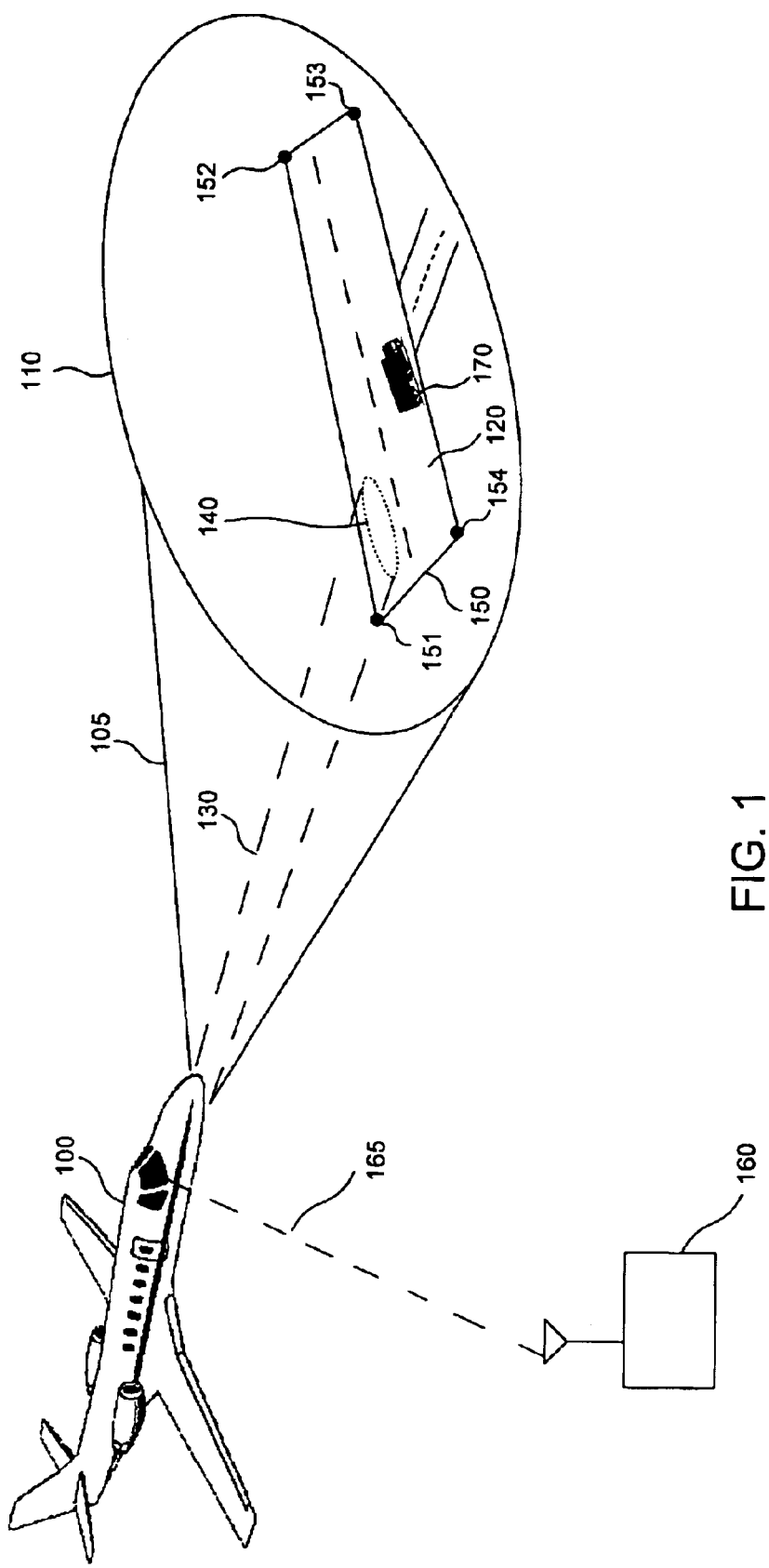
FIG. 1 is an exemplary depiction of an aircraft having an on-board radar or other sensing system, the radar or other sensing system being focused on the defined runway.

Before describing in detail the particular improved system and method, it should be observed that the invention includes, but is not limited to a novel structural combination of conventional data/signal processing components and sensing circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, an aircraft 100, such as an airplane or other flying vehicle may have on-board an airborne radar system which is capable of detecting objects on the ground. Alternatively, aircraft 100 may have any of a variety of other airborne sensing systems such as but not limited to synthetic vision systems, millimeter wave sensors, and the like. Aircraft 100 having a radar system may conventionally be used to image a large area 110 using a radar beam 105. Conventionally, imaged area 110 may be much larger than a runway 120 to which aircraft 100 is approaching.

Accordingly, it would be desirable to be able to determine the exact location of runway 120 and focus a radar beam such as beam 130 on the entire runway or a portion of the runway such as portion 140. Such a focusing may be provided by a beam sharpened, compressed pulse radar which is capable of either examining the exact latitude/longitude which is described by a polygon 150 defined by corner points 151, 152, 153, and 154 that represent the runway being approached by aircraft 100 or an area within polygon 150. Such a polygon 150 may be derived from a database having the location of the runway and which is coordinated with navigation information used by the aircraft. In an alternative embodiment, the polygon information 150 may be communicated from a ground source such as a airport control tower 160 via a radio communication 165 as aircraft 100 approaches the airport. By having the radar focused on the polygon 150, objects may be detected such as a vehicle 170 on runway 150. This may be done by using a radar which focuses on the polygon or which scans over the polygon using a series of smaller focused radar beams such as radar beam 130. As aircraft 100 approaches runway 120, detection of obstacles within polygon 150 indicate potential runway incursions or conflicts with the radar equipped aircraft. Such incursions or conflicts, such as vehicle 170 may be annunciated to the crew in a variety of ways. For example, audio warnings or visual annunciations may be used. Further, a variety of other methods may be used to alert aircraft pilots of such an incursion.

In order to properly locate a runway polygon, a registration process from a known reference may be used to guarantee that the polygon is properly located and that objects detected on the runway are actually on the runway.

In an exemplary embodiment, the system may be designed from the ground up or may be applied as an upgrade to conventional airborne radar systems, such as but not limited to the WXR-2100 Multiscan Radar available from Rockwell Collins of Cedar Rapids, Iowa. Alternatively, other radar systems may be upgraded to include the functionality described or other types of sensors may also be applied.

Figure 2:
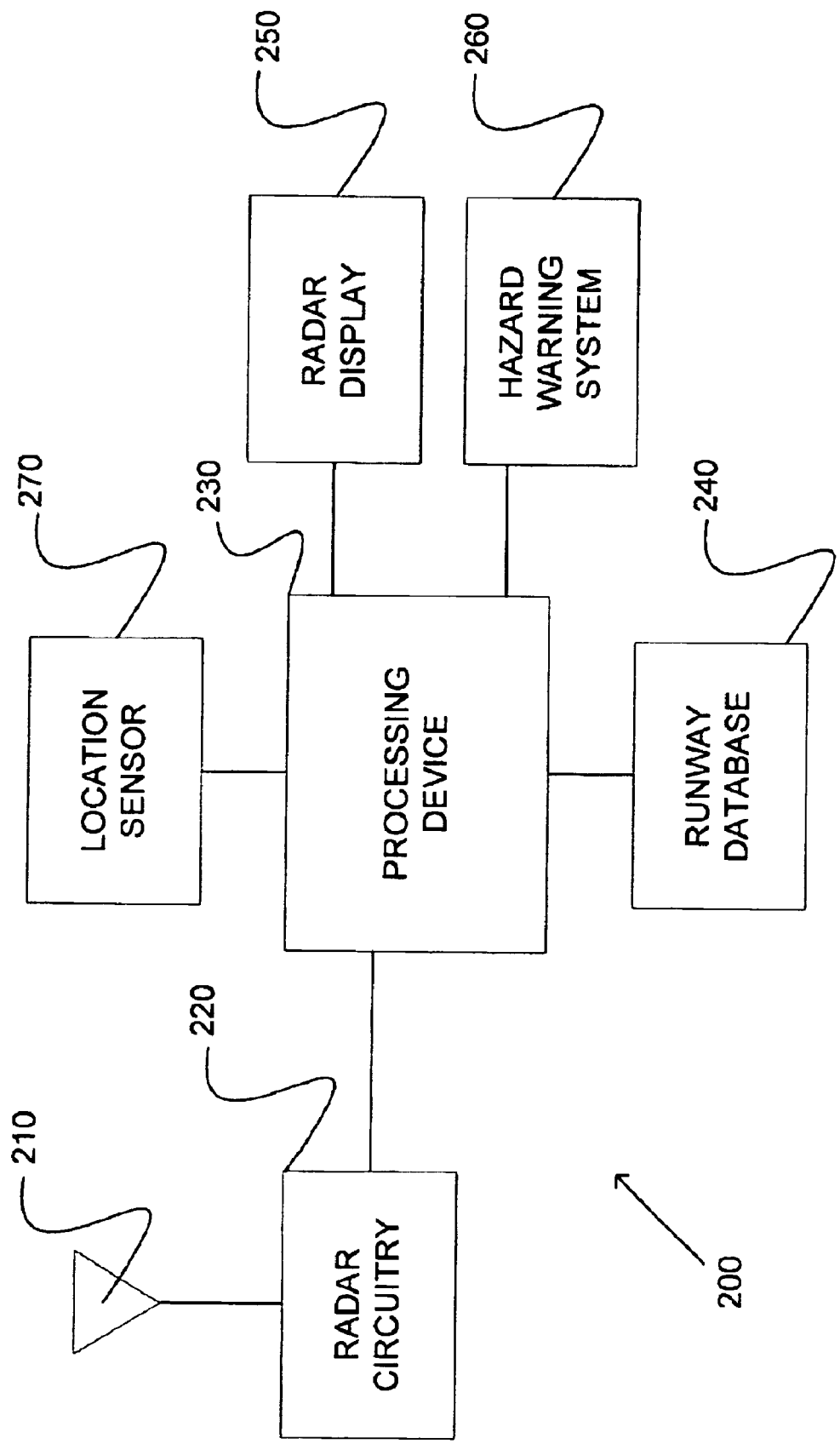
FIG. 2 is an exemplary block diagram of a radar system having a runway database.
Figure 3:
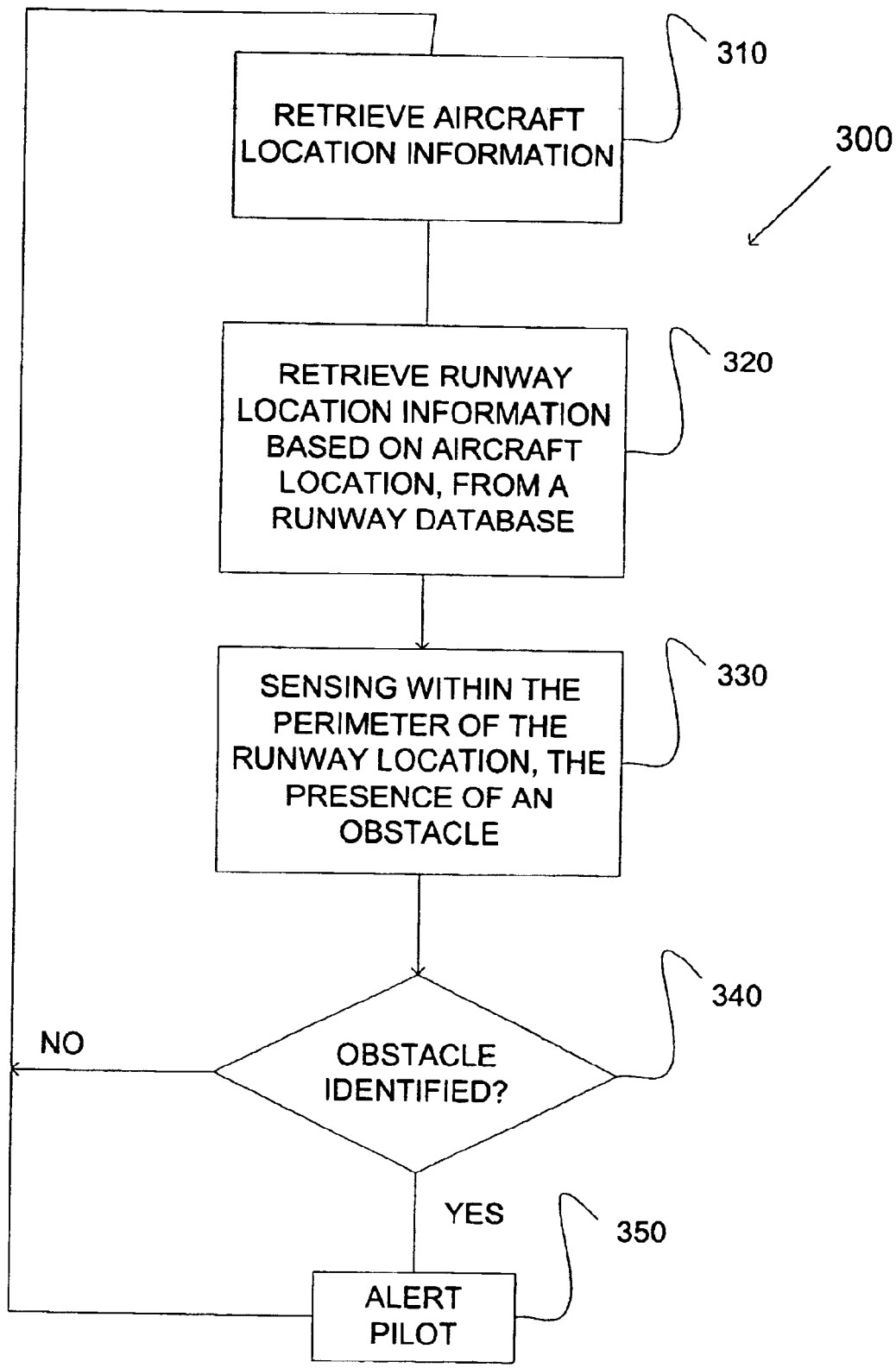
FIG. 3 is an exemplary process diagram of a runway obstacle detection system.

Referring now to FIG. 2, an exemplary block diagram of a radar system 200 is depicted. System 200 is an airborne radar system including a radar antenna 210 coupled to radar circuitry 220. Radar circuitry 220 is coupled to and communicates with a processing device 230. Processing device 230 is configured to direct the control of radar circuitry 220 to focus the radar beam in areas appropriate for runway obstacle detection. In an exemplary embodiment, processing device 230 is coupled to and communicates with a runway database 240. Runway database 240 includes coordinates (e.g. latitude and longitude) for a runway being approached by an aircraft, for example, runway 120 of FIG. 1. Runway database 240 defines a polygon such as polygon 150 in FIG. 1, which defines the runway area. The runway area is then scanned by radar circuitry 220 sending signals and receiving signals over antenna 210. Processing device 230 also interprets signals from radar circuitry 220 to display radar images on a radar display 250 which may be located in the aircraft cockpit or other location on-board the aircraft. Radar display 250 may include warning indications of obstacles within polygon 150. Alternatively, processing device 230 may be coupled to a hazard warning system 260 which may include any of a variety of warnings such as visual warnings which may be on radar display 250 or visual warnings which may be located in other areas of the cockpit, those warnings being lights, signs, etc. Also, a hazard warning system may include audio warnings which would be annunciated to the crew members within the cockpit. Hazard warning system 260 may utilize any of a variety of techniques for alerting flight crew members of obstacles which are on runway 120 being identified by on-board airborne radar within the defined polygon 150, or the like. According to an exemplary embodiment a quiet and dark paradigm may be used for the cockpit warning system.

In an alternative embodiment, radar circuitry 220 and antenna 210 may be replaced by any of a variety of other sensing devices such as but not limited to synthetic vision sensing devices and millimeter wave sensors, etc. Further, the configuration shown and described in the block diagram may be varied without departing from the scope of the invention. For example, runway database 240 may not be the means by which polygon is provided to processing device 230. For example, the runway polygon information may be provided to the processing device 230 which is on-board the aircraft via a wireless communication link between the aircraft and a land based location such as but not limited to a control tower. Further, any of a variety of user interfaces may be used to alert the flight crew. Further still, communications of an identified obstacle may be made to a control tower crew, which either is able to have the runway area cleared before the final approach of the aircraft or is able to relay that alert back to the flight crew. Yet further still, in an exemplary embodiment, any of a variety of radar devices may be used.

The system shown and described may be used as a backup or secondary system to other runway incursion systems, such as but not limited to airport surface detection equipment (ASDE) systems. Further, the system shown and described may be used for taxi and takeoff and landing situations.

In a further exemplary embodiment, a location sensor 270 may communicate the location of the aircraft to processing device 230. The location of the aircraft is then used to first retrieve the coordinates of the respective approaching runway from runway database 240 and also to coordinate the display of the runway polygon on a radar display 250 as the aircraft approaches the runway as well as to direct the beam of the radar based on the present location of the aircraft. Such a location sensor may include standard navigation sensing devices, including but not limited to global positioning system (GPS) receivers and/or inertial navigation systems, and the like.

In accordance with an exemplary embodiment, a process 300 may be used to provide runway obstacle detection. An airborne aircraft may retrieve aircraft location information from a positioning system (step 310). Once the aircraft location is determined and the aircraft is in a landing configuration, the system retrieves runway location information from a runway database (step 320). The runway location information defines a polygon which approximates the perimeter of the runway. An on-board radar or other sensing system detects whether there is an obstacle within the runway perimeter (step 330). If an obstacle is not identified (step 340), process 300 is begun anew until the aircraft lands or until an obstacle is detected. If an obstacle is detected (step 340), the pilot or other flight crew member is alerted.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. An airborne radar system, comprising:
   a radar antenna;
   radar circuitry coupled to the radar antenna;
   a runway database comprising runway location information;
   a processing device retrieving from the runway database, runway location information for a runway being approached by an aircraft, based on the location of the aircraft, and directing a radar beam to scan the area inside a polygon which represents the perimeter of the runway and which is derived from the runway information, the processing device determining whether there are any obstacles on the runway.

2. The airborne radar system of claim 1, wherein the location of the aircraft is provided using a position sensor in communication with the processing system.

3. The airborne radar system of claim 1, wherein the polygon is defined by latitude and longitude.

4. The airborne radar system of claim 1, wherein the runway database is on board the aircraft.

5. The airborne radar system of claim 1, wherein the radar beam is a beam sharpened compressed radar.

6. The airborne radar system of claim 1, wherein the processing device determines the direction of the radar beam based on the location of the polygon.

7. An airborne sensing system, comprising:
   a sensing device for sensing objects outside of an aircraft;
   a runway database comprising runway location information;
   a processing device retrieving from the runway database, runway location information for a runway being approached by an aircraft, based on the location of the aircraft, registering, the runway location using the sensing device based signal and the runway location information from the database, and directing a radar beam to scan the area inside a polygon which represents the perimeter of the runway and which is derived from the runway information, the processing device determining whether there are any obstacles on the runway.

8. The airborne sensing system of claim 7, wherein the sensing device comprises a synthetic vision device.

9. The airborne sensing system of claim 7, wherein the sensing device comprises a millimeter wave sensing device.

10. The airborne sensing system of claim 7, wherein the location of the aircraft is provided using a position sensor in communication with the processing system.

11. The airborne sensing system of claim 7, wherein the polygon is defined by latitude and longitude.

12. The airborne sensing system of claim 7, wherein the runway database is on board the aircraft.

13. The airborne sensing system of claim 7, wherein the radar beam is a beam sharpened compressed radar.

14. The airborne sensing system of claim 7, wherein the processing device determines the direction of the radar beam based on the location of the polygon.

15. A method of detecting an obstacle on a runway, comprising:
   retrieving location information relating to the location of an aircraft from a location sensor;
   retrieving, based on the location information, data representative of the location of the runway relative to the aircraft;
   registering, the runway location using a radar based signal and the data;
   sensing within the perimeter of the runway location, the presence of an obstacle by directing a beam sharpened radar to scan the area inside a polygon which represents the perimeter of a runway and which is derived from the data.

16. The method of claim 15, further comprising:
   determining the location of the obstacle within the perimeter of the runway location.

17. The method of claim 15, flirter comprising:
   communicating the presence of an obstacle to a pilot of the aircraft.

18. The method of claim 15, further comprising:
   providing an audio alert to the pilot of the aircraft.

19. The method of claim 15,
   wherein the directing is to a portion of the runway.

* * * * *